(12) United States Patent
Biffignani et al.

(10) Patent No.: US 10,690,771 B2
(45) Date of Patent: Jun. 23, 2020

(54) METHOD AND APPARATUS FOR OBJECT DETECTION USING HUMAN ECHOLOCATION FOR THE VISUALLY IMPAIRED

(71) Applicant: Sondare Acoustics Group LLC, St. Louis, MO (US)

(72) Inventors: Michael J. Biffignani, St. Louis, MO (US); Robert Stretch, St. Louis, MO (US); Tim Chen, St. Louis, MO (US)

(73) Assignee: Sondare Acoustics Group LLC, St. Louis, MO (US)

( * ) Notice: Subject to any disclaimer, the term of this patent is extended or adjusted under 35 U.S.C. 154(b) by 234 days.

(21) Appl. No.: 15/789,072

(22) Filed: Oct. 20, 2017

(65) Prior Publication Data

US 2018/0113213 A1 Apr. 26, 2018

Related U.S. Application Data

(60) Provisional application No. 62/410,950, filed on Oct. 21, 2016.

(51) Int. Cl.
*G01S 15/93* (2020.01)
*G01S 15/42* (2006.01)
(Continued)

(52) U.S. Cl.
CPC ............... *G01S 15/93* (2013.01); *A61H 3/06* (2013.01); *A61H 3/061* (2013.01); *G01S 15/42* (2013.01);
(Continued)

(58) Field of Classification Search
CPC .......... G01S 15/93; G01S 15/42; G01S 7/521; G09B 21/00; G09B 21/006;
(Continued)

(56) References Cited

U.S. PATENT DOCUMENTS 3,158,851 A    11/1964  Ruthven
4,280,204 A *  7/1981   Elchinger .............. A61H 3/061
                                                              135/76
(Continued)

FOREIGN PATENT DOCUMENTS

EP         1921890 A2    5/2008
WO      1997017043 A1    5/1997

OTHER PUBLICATIONS

Kish, https://www.ted.com/speakers/daniel_kish, Mar. 2015.
(Continued)

*Primary Examiner* — Hovhannes Baghdasaryan
*Assistant Examiner* — Amie M Ndure
(74) *Attorney, Agent, or Firm* — Husch Blackwell LLP

(57) ABSTRACT

The present device is an object detection device for assisting individuals with visual impairments to detect objects in front of him or her when walking or riding a bike. The device preferably includes an assistive device like a cane and an echolocation device coupled to the walking assistive device. When a user signals for the echolocation device to do so, the echolocation device uses a parametric array to generate a sound beam. If an object is in front of the user, the audible narrow sound beam reflects off of the object creating a strong, clear echo sound beam toward the user's ear. Because the user is preferably trained in echolocation, he or she is able to determine the distance, position, and possibly the type of object.

16 Claims, 5 Drawing Sheets

(51) Int. Cl.
*A61H 3/06* (2006.01)
*G09B 21/00* (2006.01)
*G01S 7/521* (2006.01)

(52) U.S. Cl.
CPC .... *G09B 21/006* (2013.01); *A61H 2201/0153* (2013.01); *A61H 2201/0192* (2013.01); *A61H 2201/165* (2013.01); *A61H 2201/1635* (2013.01); *A61H 2201/5005* (2013.01); *A61H 2201/5025* (2013.01); *A61H 2201/5048* (2013.01); *G01S 7/521* (2013.01)

(58) Field of Classification Search
CPC .... A61H 2201/0153; A61H 2201/5048; A61H 2201/0192; A61H 2201/1635; A61H 2201/165; A61H 2201/5005; A61H 2201/5025; A61H 3/06; A61H 3/061
See application file for complete search history.

(56) References Cited

U.S. PATENT DOCUMENTS

| | | |
|---|---|---|
| 6,469,956 B1 | 10/2002 | Zeng |
| 7,706,212 B1 | 4/2010 | Campbell |
| 8,477,063 B2 | 7/2013 | Meyers et al. |
| 8,750,540 B2 | 6/2014 | Tan |
| 8,750,541 B1 | 6/2014 | Dong et al. |
| 9,600,982 B2 * | 3/2017 | MacIntosh |
| 2012/0051556 A1 | 3/2012 | Pompei |
| 2013/0113601 A1 | 5/2013 | San Luis et al. |
| 2015/0269825 A1 * | 9/2015 | Tran ............ G08B 21/0446 340/539.12 |

OTHER PUBLICATIONS

Biffignani, A Study of Sound Conduction to Provide Spatial Information in Navigation Systems for the Visually Impaired, www.thebookpatch.com, Nov. 6, 2015.

* cited by examiner

METHOD AND APPARATUS FOR OBJECT DETECTION USING HUMAN ECHOLOCATION FOR THE VISUALLY IMPAIRED

CROSS-REFERENCE TO RELATED APPLICATIONS

This application claims the benefit of U.S. Provisional Application No. 62/410,950, filed Oct. 21, 2016, which is hereby incorporated by reference in its entirety.

FIELD OF THE INVENTION

The described invention relates to the field of echolocation. Specifically, the invention relates to an echolocation device that may be used by visually impaired individuals to help detect objects or elevation changes in the individual's path.

BACKGROUND OF INVENTION

Visually impaired individuals, of whom there are upwards of 285 million worldwide, have long relied on objects like canes and guide dogs to assist with object detection and navigation. More modern systems often make use of more advanced technologies, such as an object detection device using ultrasonic transducers. Those devices may generate ultrasonic waves that produce an echo from a detected object. The echo is then detected and received by receivers that alert a visually impaired individual of objects in front of him or her. In those devices, because ultrasonic waves are undetectable by a human ear, a receiver, separate from the human ear, is needed to receive information about objects at a distance from a wearer.

Those sorts of devices often make use of the information encoded by the receiver to provide tactile or audio feedback to a user. For example, one "smart cane" employed provides a vibration to a user to indicate that a nearby object is detected in front of the cane user. Another wearable device embodied as glasses provides a vibration to a user to indicate that a nearby object is detected. Visually impaired users often find these vibrations (or sounds, provided by other object detection aids or wearables) to be annoying and distracting.

Human echolocation allows humans to detect objects in their environment by generating sounds and sensing echoes from the sounds created by objects in front of him or her. Those echoes are typically created by first actively generating sounds such as cane tapping, hand claps, finger snapping, a mechanical device such as a clicker or making clicking sounds with their mouths. People trained to orient by echolocation, often visually impaired individuals, may be able to interpret the sound waves that are reflected by nearby objects and accurately identify the location, size, distance and characteristics of the object. Visually impaired individuals may use this ability as a form of acoustic wayfinding, or navigating within an environment using auditory rather than visual cues. This echolocation ability is similar to active sonar and animal echolocation, which is employed by bats, dolphins, and whales (among others) to identify prey.

However, with respect to echolocation, it is often difficult for a person to generate a strong, targeted signal that is narrowly channeled to detect objects in front of him or her especially at a distance and above the waist. Instead, a mouth-click signal decays as the wave spherically propagates away from the source. As such, the signal has a limited range in which it can detect objects. Moreover, the echo signal is not very strong by the time it has attenuated on its way to a receiver, whether the receiver is electronic or a human ear.

Even moreover, an individual who uses his or her mouth to generate clicking sounds can experience echo masking. More specifically, because the mouth is in close proximity to the ears, the response echo may be "masked" by the original sound signal generated by the mouth-click. This can make it much more difficult for a person to hear the echo, let alone locate from where the echo is originating.

Parametric arrays have been used in the audio industry for some time to generate a narrow audio signal. As known in the art, a parametric array is a nonlinear transduction mechanism that uses ultrasonic transducers to generate a narrow beam of audio band frequency sound, through the mixing and interaction of high intensity ultrasonic soundwaves. Thus, beams of sound generated by parametric arrays take into account the combined effects of diffraction, absorption, and nonlinearity. As such, parametric arrays can create a strong directional sound beam with no side lobes in water and air.

A parametric array can fulfill the need to provide a device to assist visually impaired individuals with a more targeted, narrow signal for object detection. That way, the user has a better idea of what is in front of him or her at greater distances and at a higher elevation above the ground. The device should not require the use of headphones or head-mounted speakers, and it should not use distracting audio or tactile indicators to alert a wearer that an obstacle is detected in front of him or her. Furthermore, the device should be positioned such that the projection of the sound beam is away from, and in front of, the individual such that it does not mask the received echo. That way, more echo energy is received by the ears.

SUMMARY OF INVENTION

The present invention provides an object detection device to assist individuals with visual impairments to detect objects in front of him or her. The device preferably may include a handle member to carry the object detection device or a cane member coupled to the object detection device. In other embodiments, other assistive walking devices like walkers could be used instead of the cane member. In yet other embodiments, the echolocation device, or object detection device, may be coupled with a bicycle, or it may be handheld, or even wearable.

The echolocation device preferably includes a parametric array including a transducer array that is also coupled to the cane member such that when the cane member is used, the transducer array faces away from the user. An electronics unit also associated with the echolocation device preferably includes a power source to supply power to the parametric array. The electronics unit also preferably includes a sound card with memory and an electronic switch (also powered by the power source) easily accessible to a user that is configured to control the source signal fed to the parametric array housed within the electronics unit.

When a user triggers the electronic switch as described below, an ultrasonic wave and an audio signal are modulated and amplified before being produced by the transducer array. The high intensity primary ultrasonic wave produced by the transducer array is absorbed in the near field and through self-modulation, the audio signal remains in the far field. Thus, objects located at a greater distance from the user can be detected. When an object is detected in front of a user, audible sound bounces off of the object and returns to the user so he or she (who is preferably extensively trained in human echolocation) can determine the object's distance and/or location and characteristics, using human echolocation principles.

To use the object detection device, a user typically first engages an activation member such as the above described electronic switch, or alternatively a button, trigger, or other device to initiate signal generation within the electronics unit of the echolocation device. After receiving instructions to generate an audio signal from the activation member, a sound signal is recalled from memory in a sound card contained within the electronics unit. The sound signal is then preferably sent to the parametric array which uses the transducer array to create the sound beam. In the near field, the high intensity ultrasonic carrier signal is quickly absorbed, leaving the narrow beam (3°-10°) sound signal to project outwardly toward any objects located in front of the transducer array.

That signal, which may be embodied as a click, a recording of the user's mouth click or other sound (such as an electronically generated click or warp tone), or other programmable sound may then be propagated away from the user by the transducer array toward an object in front of the user.

The choice of source signal (recalled from memory) may be chosen to optimize the frequency bandwidth of the echo signal. When the source signal has a greater bandwidth, smaller objects may be detected in front of a user.

If an object is deemed to be in front of the user, sound is reflected off of the object, and transmitted back to the user's ear. The user, who is preferably extensively trained in human echolocation, is then preferably able to determine the distance, location and characteristics of the object in front of him or her using only his or her own ears.

DETAILED DESCRIPTION OF THE INVENTION

The present invention relates to an object detection device that uses echolocation and may be used by the visually impaired to assist with his or her spatial awareness. The device preferably outputs a sound beam that produces an echo when it reflects off of an object in front of a user. That way, a user can use echolocation training to determine where an object is in front of him or her, how far away the object is, how large the object is, and possibly what type of material the object is made of.

Figure 1:
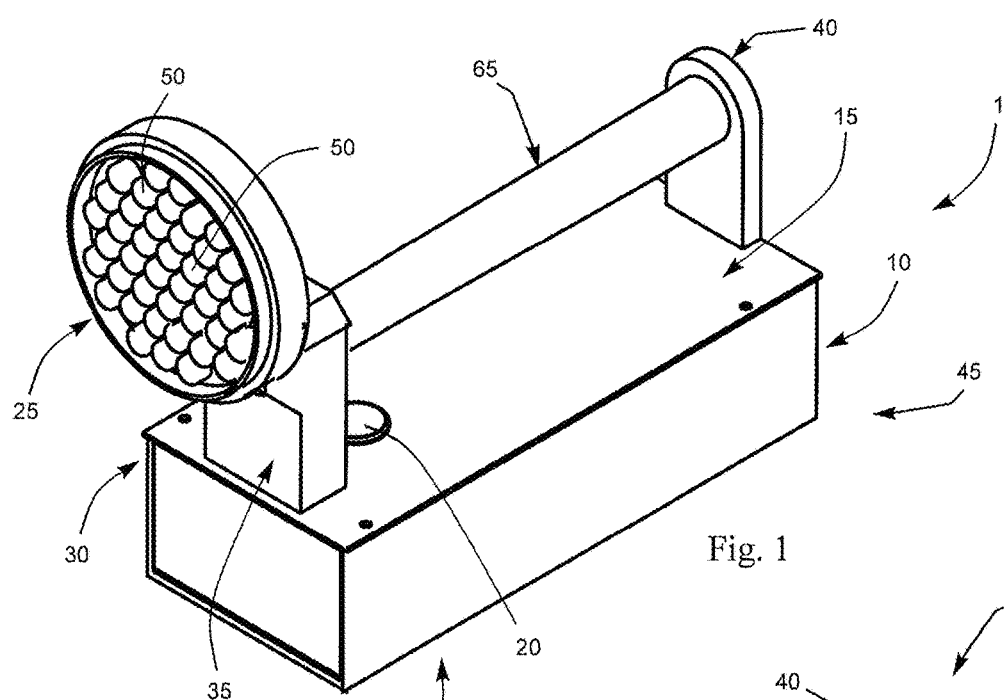
FIG. 1 is a perspective view of an object detection aid device constructed according to the teachings of the present invention.
Figure 2:
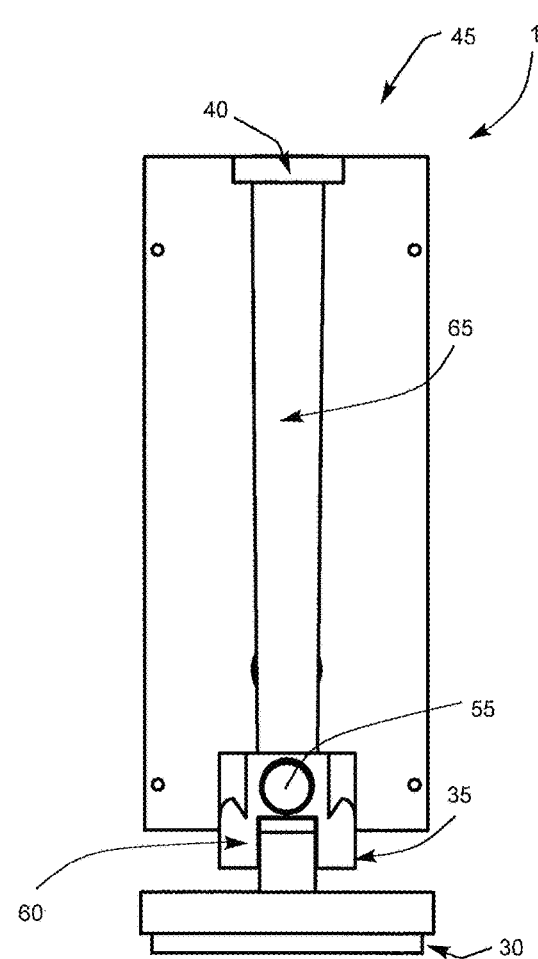
FIG. 2 is a top plan view of the object detection device of FIG. 1.

Referring now to FIGS. 1 and 2, an example echolocation or object detection device 1 is provided in perspective and plan views, respectively. At a lower side 5 of the object detection device 1, an electronics unit 10 is preferably provided for controlling and powering a parametric array (not illustrated) contained within the electronics unit 10. As known and understood in the art, and for the purposes described below, the electronics unit 10 preferably includes at least each of a power source, sound card with memory, modulator, and amplifier. The power source may be of any type that is often used by those skilled in the art, and it preferably is a mobile power source such as a battery unit. That way, a user does not need to have the object detection device 1 plugged in when in use, which could cause a tripping hazard and also defeat the purpose of the object detection device 1 when a person is walking and using the object detection device 1. A cord also would limit the distance in which a person could walk when using the object detection device 1.

The power source may be disposable, but it is rechargeable in a preferred embodiment. At a top portion 15 of the electronics unit 10, a power button 20 (see FIG. 1) is preferably provided for turning on and turning off the power source within the electronics unit 10. In alternative embodiments, the power button 20 may be replaced with a switch, dial, or other known or foreseeable mechanism for turning on or turning off the power source.

Figure 5:
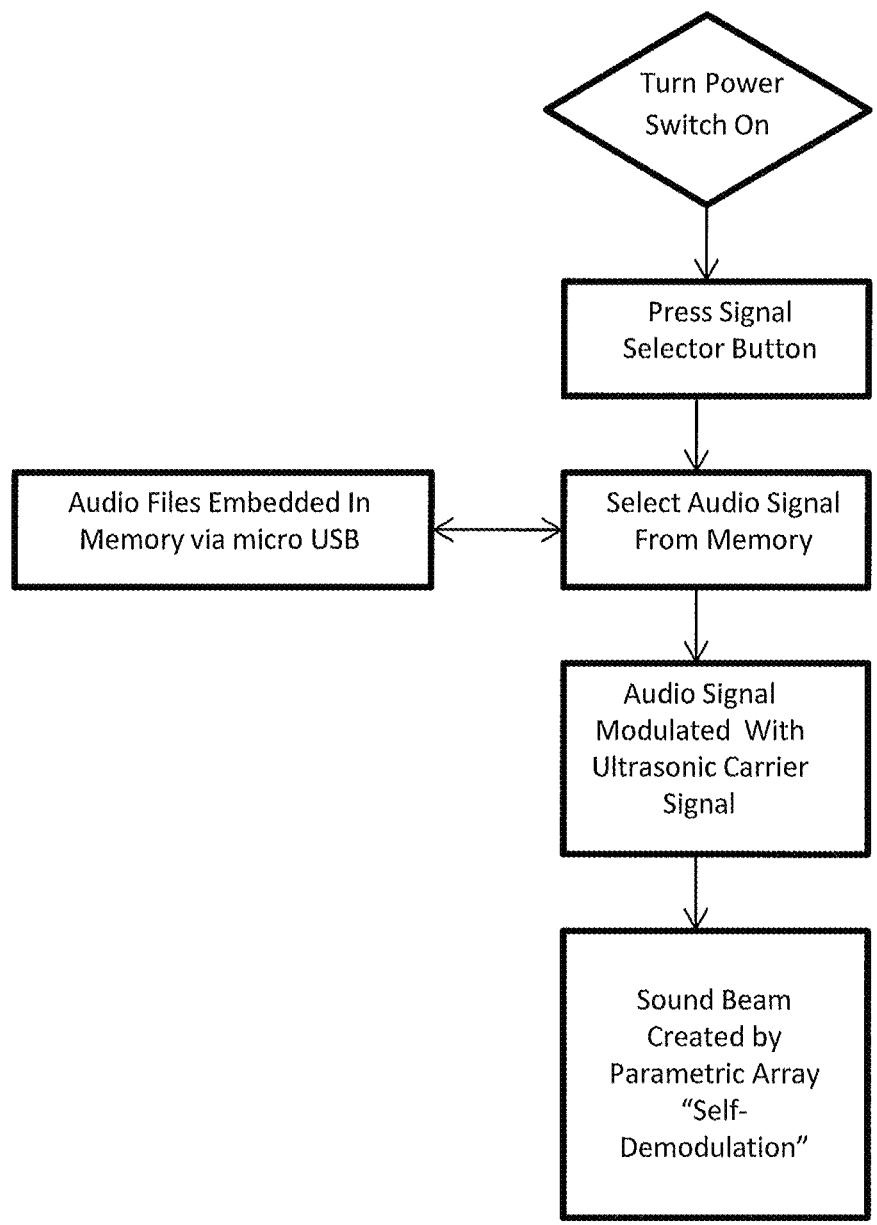
FIG. 5 is a flowchart demonstrating the operation of the object detection device of FIGS. 1-4.

The sound card with memory of the electronics unit 10 may be of any type that is able to store and recall files such as clicking sounds and other audio files (including preferred programmable or recordable audio files like a wooden castanet), and preferably includes a micro USB interface. This allows for loading audio files from an external device. The manner in which the object detection device 1 utilizes the memory in its operation is detailed below when describing the flowchart of FIG. 5 illustrating how the object detection device 1 works in operation.

The parametric array within the electronics unit 10 may be substantially similar to other parametric arrays known or used in the art. As such, it preferably includes each of a source audio signal (e.g., a clicking sound), an ultrasonic sound signal, a modulator circuit, an amplifier, and a transducer array. In the embodiments illustrated in FIGS. 1 and 2, a transducer array 25 is located at a front portion 30 of the object detection device 1. The transducer array 25 is located at the front portion 30 of the object detection device 1 because it should be in front of and away from a user's ears when the object detection device 1 is activated to produce what is eventually a sound beam, as will be described below. If the transducer array 25 were not located near the front portion 30, it would be more likely to mask the echo that may be produced by a sound beam by being too close to a user's ears. In that case, the user may hear more of the source audio signal itself than an echo produced by the sound beam reflecting off of an object in front of the user. This masking effect would make it more difficult for a user to determine the distance, size, location, etc. of an object in front of him or her.

The electronics unit 10 also preferably includes a front bracket member 35 located at its front portion 30 and a rear bracket member 40 located at a rear portion 45 of the electronics unit 10. Both of the front bracket member 35 and the rear bracket member 40 may project upwardly from the top portion 15 of the electronics unit 10. The front bracket member 35 and the rear bracket member 40 may be integrally formed with the electronics unit 10, or they may be removably attached thereto (for example, by screws).

The transducer array 25 is illustrated as mounted to the front bracket member 35. As such, the front bracket member 35 is preferably at least partly hollow such that the transducer array 25 is in wired communication with various electronic components within the electronics unit 10. In the illustrated embodiment, the transducer array 25 preferably comprises a plurality of ultrasonic transducers 50, which may take the form of any of ultrasonic piezoelectric transducers, electrostatic ultrasonic transducers, electrostrictive ultrasonic transducers, electro-thereto-mechanical film ultrasonic transducers, or polyvinylidene fluoride film ultrasonic transducers. The ultrasonic transducers 50 in FIG. 1 are generally circular in shape and arranged in a circular array. More particularly, each ultrasonic transducer 50 is illustrated as being 10 mm in diameter, though other sizes are foreseeable.

An array of multiple ultrasonic transducers such as the ultrasonic transducers 50 are preferably used so as to provide a greater output. The radius of the transducer array 25, and the radius of the ultrasonic transducers 50 that make up the transducer array 25, are related to the power and length of the sound beam generated in the far field (described below). As such, in other embodiments, the transducer array 25 and/or transducers 50 may take on different sizes and/or shapes so that different length sound beams may be created. Depending on the environment in which the object detection device 1 is used, it may be advantageous to alter the size and/or shape of the transducer array 25 and/or transducers 50 to affect the signal's length and/or distance. In other examples, the transducer array 25 may be arranged in a curvilinear or other two-dimensional configuration rather than a circular array.

As shown in FIG. 2, the front bracket member 35 may further include a selector button 55 positioned and located on an upper portion 60 of the front bracket member 35. The selector button 55 is preferably used to initiate the process of generating what eventually becomes a sound beam produced by the transducer array 25. It also allows the user to cycle through the various types of audio signals that may be generated by the object detection device 1, as will be described herein below in greater detail when describing the flowchart illustrated in FIG. 5. In alternative embodiments, the selector button 55 may be embodied as a switch, dial, or a similar mechanism.

Figure 3:
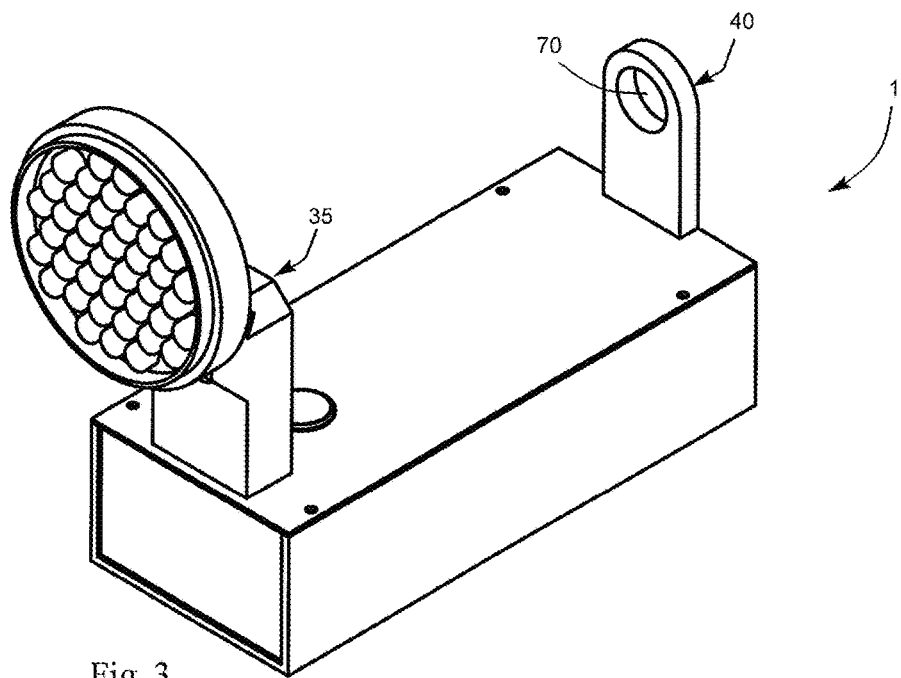
FIG. 3 is a perspective view of the object detection device with its handle removed.

The object detection device 1 is provided in FIGS. 1 and 2 with a handle member 65 that is selectively attachable with the bracket members 35, 40. The handle member 65 may be used by a user to grasp the object detection device 1 when used. As shown in FIG. 3, the rear bracket member 40 may include an aperture 70 in which an end portion of the handle member 65 may be friction fit to releasably attach the handle member 65 to the rear bracket member 40. Though not illustrated, the front bracket member 35 also preferably includes an aperture in which the other end portion of the handle member 65 may be friction fit. In alternative embodiments, the handle member 65 may be selectively attachable with the object detection device 1 in other known or foreseeable ways.

Figure 4:
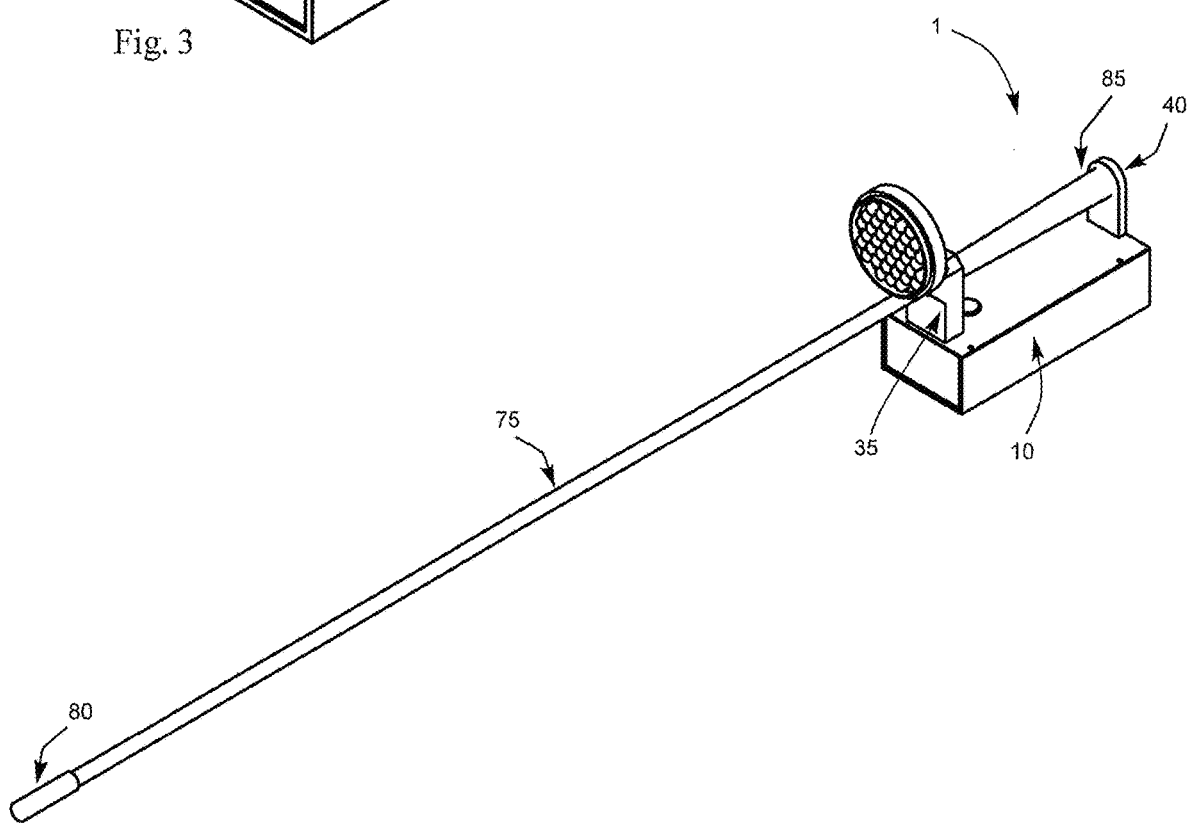
FIG. 4 is a perspective view of the object detection device of FIGS. 1-3 further including a walking aid device.

Turning now to FIG. 4, an alternative embodiment of the object detection device 1 with a cane member 75 substituted for the handle member 65 is illustrated. As shown in FIG. 4, the cane member 75 is also connected to the bracket members 35, 40. However, in this embodiment, the cane member 75 is preferably tapered in a manner that allows a distal end 80 of the cane member 75 to penetrate through the aperture (not illustrated) of the front bracket member 35, rather than be friction fit therein. Even so, the cane member 75 preferably has a diameter that allows it to be snugly fit within the apertures of the bracket members 35, 40 of the object detection device 1 so as not to move around when in use, as described below with respect to FIGS. 6 and 7. In alternative embodiments, the object detection device 1 and the cane member 75 may be releasably attached to one another using different known or foreseeable mechanisms, including but not limited to, strap attachments, hook attachments, and the like.

The cane member 75 is substantially similar to cane members that are known and understood in the art. Cane members such as the cane member 75 are long known in the art and are often used by the visually impaired as "feelers" to help detect objects that are in front of a visually impaired person when he or she is walking. In prior art embodiments where a cane member such as the cane member 75 is used alone without other detection devices, a user typically waves the cane member 75 in a sweeping fashion, both up and down and side to side, to detect objects in front of him or her. The user typically does so at ground level and also does so to detect elevation changes like slopes or steps. It is typically a challenge for a user to use a cane member like the cane member 75 to detect higher objects like branches and street signs.

Preferably, the cane member 75 includes each of a proximal end 85 and the distal end 80. Typically, the proximal end 85 is grasped by a user when the cane member 75 is in use, and the distal end 80 is away from the user when the cane member 75 is held by a user. The distal end 80 may serve to physically touch and detect objects in front of a visually impaired person when he or she is using the cane member 75 as a walking tool. The cane member 75 may also be used to move an object aside that is in front of a walking visually impaired person.

In alternative embodiments, the object detection device 1 may be used with a walker or even a bicycle to assist a visually impaired individual with object detection in front of him or her at elevations higher than the ground's elevation. In those embodiments, the object detection device 1 may be releasably attached to the walker or bicycle in a number of known or foreseeable ways, including a friction fit, strap attachment, or otherwise. Similarly, the object detection device 1 may be embodied as a "wearable," such as clothing, accessories, or equipment already donned by a user (or that could be easily donned with minimal interference with daily life).

In some of those embodiments, the electronics unit 10 may also include various electronic components that allow the object detection device 1 to perform "electronic sweeping." Electronic sweeping may perform the task currently primarily conducted by the user by sweeping from left to right or up to down (or vice versa) to detect objects in the path of the user. This feature may be particularly useful in embodiments where the object detection device 1 is used with a walker or other more predominantly stationary device. It also may be useful in the embodiment where the cane member 75 is used, even if to a lesser extent than when used with a device like a walker that would not perform either of a side to side or up and down "sweeping."

It should be noted that the electronics unit 10 serves a purpose other than to house and contain the various electronics mentioned above. For one, the electronics unit 10 adds balance to the object detection device 1 to make the objection detection device 1 feel more ergonomically comfortable in the hands of a user. Moreover, when the cane member 75 is used with the object detection device 1, the electronics unit 10 preferably balances well with the cane member 75 so as not to detract from the usefulness of the cane member 75 achieved when used alone.

Turning now to FIG. 5, the process for generating a sound beam is provided in flowchart form. The process first preferably begins with turning the power button 20 or a comparable switch to the "on" position if the object detection device 1 starts in the "off" configuration. If the device is already "on," this first step may be bypassed, and a user may proceed to the next step.

After ensuring the device is turned on, a user may depress the selector button 55 (or comparable switch or other activation member) to begin signal generation. By depressing the selector button 55, a first audio signal is selected from memory. The audio signal is preferably embedded as an audio file within the above described memory in the electronics unit 10. That memory may be in the form of a micro sound board with a USB interface, though other memory devices are certainly foreseeable and compatible with the object detection device 1 disclosed herein.

Should the user depress the selector button 55 an additional time, a different audio signal than the first is called from memory. If the selector button 55 is depressed again, yet another different audio signal is called from memory. In some embodiments, there may be many audio signals through which a user may cycle. In a preferred embodiment, there are four audio signals that a user may cycle through. In that embodiment, the fourth audio signal is no signal. Thus, the fourth "silent" signal may act as a temporary idling of the device 1, where the device 1 is not sending signals but is not entirely turned off. The audio source signal selected may be chosen to optimize the frequency bandwidth of the echo signal. When higher frequencies are present, with shorter wavelengths, smaller objects may be detected.

When an audio signal is called from the memory, the parametric array within the electronics unit 10 first preferably modulates an ultrasonic carrier signal with the selected audio signal. The ultrasonic carrier signal is preferably close to 40 KHz (this is the resonance frequency of common 10 mm piezotransducers used in the preferred embodiment), though other comparable signals may be used when other transducers are used. The parametric array then preferably modulates the ultrasonic carrier signal with the audio signal. In a preferred embodiment, each of the carrier and the modulator are located on a pulse width modulator (PWM) chip.

After the two signals are modulated, the resulting signal is preferably amplified by an amplifier also contained within the parametric array. A modulated high power signal with a magnitude near 110 dB may then be generated, with the high power signal at this time still including each of the ultrasonic signal and the audio signal. The high power signal is then preferably output by the transducer array 25. The high frequency ultrasonic carrier signal portion of the modulated signal, at approximately 40 KHz and 110 dB may quickly be absorbed due to the nonlinearity of the fluid (air). The demodulated audio signal remains and then preferably radiates as a sound beam in the far field. Due to nonlinearity of air, the parametric array can be known as a "self-demodulator" which creates an audio frequency narrow sound beam with no side lobes, as compared to a spherically spreading signal from a traditional speaker.

After the selector button 55 has been depressed, and a particular audio signal has been selected, this signal may continue until a user intervenes by switching to another signal or to the "non-signal," or silent, setting, or turns the device 1 off entirely.

The resulting audio signal sound beam is preferably strong enough to reach objects in the far field. More particularly, when objects are located in front of the object detection device, the resulting sound beam is preferably strong enough to reach those objects such that an echo may be produced that bounces off of the object and returns toward a user's ears such that he or she is able to apply human echolocation principles to help determine the size, location, material, etc. of objects or elevation changes in front of him or her. As shown and described in FIGS. 6 and 7 (described below), the object detection device 1 may sweep up and down or side to side to detect objects in multiple axes and directions in front of a user.

Figure 6:
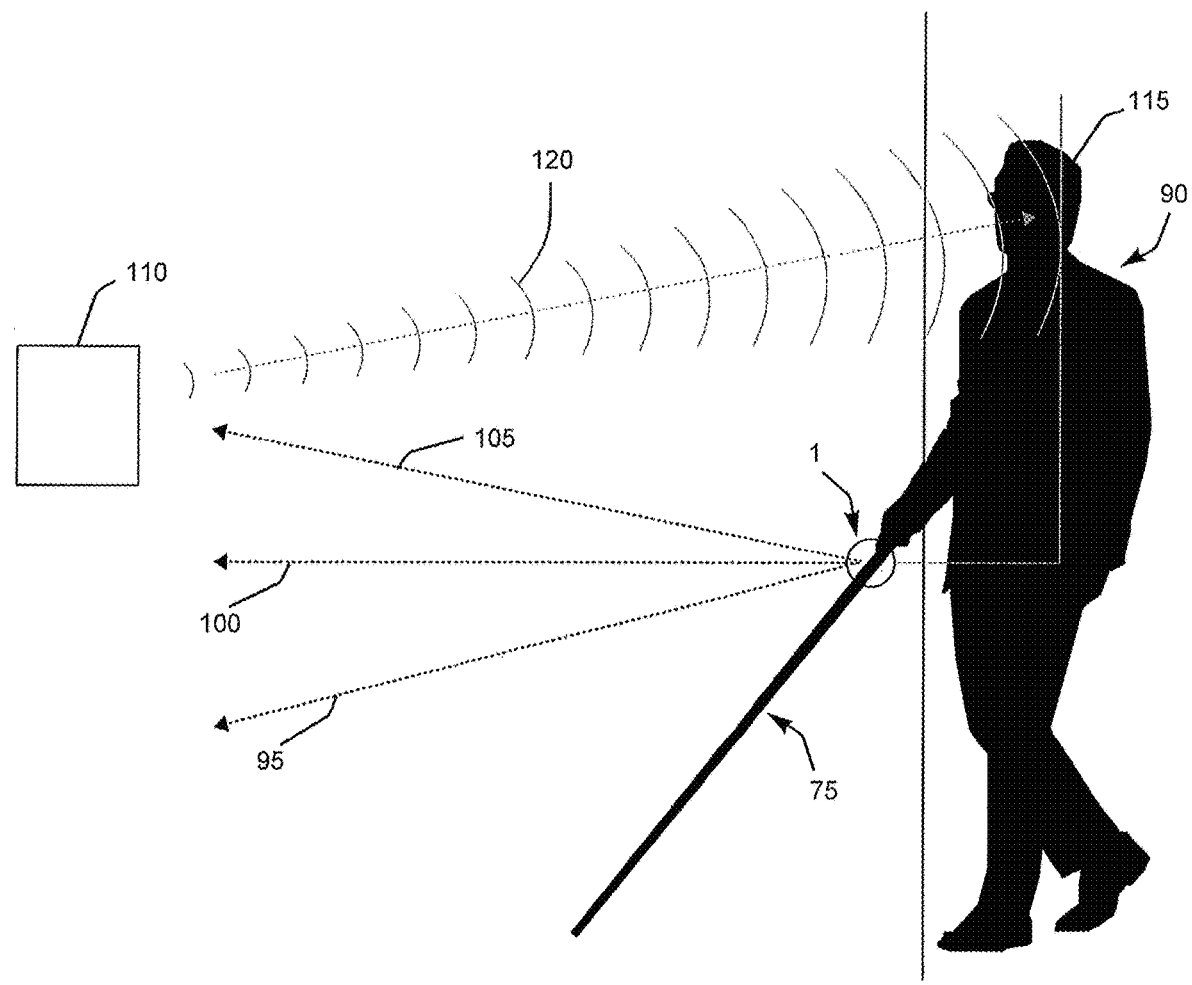
FIG. 6 is an elevation view of a schematic illustrating the object detection device in use.

Turning first to FIG. 6, a user 90 is shown as using the object detection device 1 of the embodiment that includes the cane member 75. FIG. 6 illustrates the ability of a user such as the user 90 to vertically scan the environment for objects in his or her way. In the illustrated embodiment, example audible sound beams that may be generated by the object detection device 1 are represented by arrows 95, 100, 105. The audio beams 95, 100, and 105 are embodied and shown as examples in FIG. 6 to reproduce each of a lower beam 95, a middle beam 100, and an upper beam 105. These beams are not limiting by any means and are merely shown as example beams that may be produced as a user uses the object detection device 1 (whether by itself with a handheld, the cane member 75, a walker bicycle, or wearable) to sweep the vertical area in front of him or her.

As illustrated in FIG. 6, the sound beams 95, 100, 105 may originate from a position in front of a user, and potentially detect a hypothetical low object, middle object, or a high object such as the object 110 illustrated in FIG. 6. Because the object detection device 1 (and potentially associated cane member 75) are out in front of the user 90 and near his or her hand, he or she may be able to more easily adjust the device 1 to detect objects waist high or above that a cane alone may not be able to detect (e.g., tree branches, road signs).

In the example embodiment provided in FIG. 6 where there is an object 110 in front of the user 90 (and not at the locations where the beams 95, 100 would strike an object), the audio signal beam 105 reflects off of the high object 110 and returns toward a user's ears 115 in the form of an echo 120. Preferably, the echo 120 is also a reflected sound beam directed toward the user's ear canal to minimize the possibility that someone other than the user can hear the audible sound waves. The user then is preferably able to identify that the object is a high object 110, based on what he or she hears and his or her extensive training in echolocation.

In alternative embodiments where the beams 95 or 100 strike a low object or a middle object, respectively, echoes (not illustrated) may still be able to make their way back to the ear 115 of a user. In those embodiments, the user is able to detect, based on his or her extensive echolocation training, that an object is located at either of the low or middle regions, and may even be able to detect more information like the object's size or composition.

Figure 7:
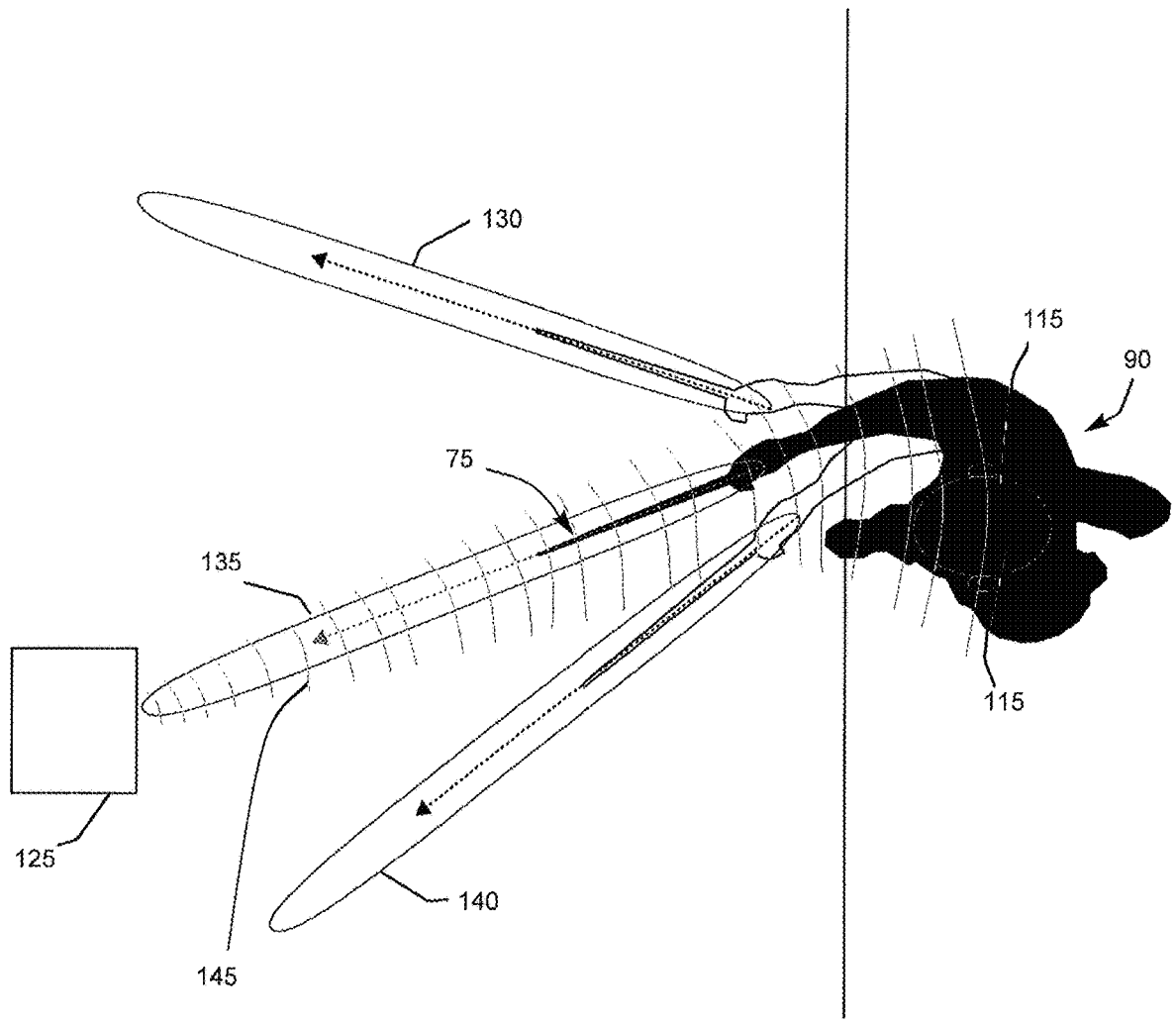
FIG. 7 is a top plan view of a schematic illustrating the object detection device in use.

Turning now to FIG. 7, the user 90 is shown trying to identify a lateral position of an object, in this case, object 125. As shown in FIG. 7, the user 90 is waving or sweeping the object detection device 1 and the cane member 75 laterally from side to side. FIG. 7 illustrates each of a right position 130, left-center position 135 and left position 140, though virtually any lateral position may be scanned by the user 90, and the aforementioned positions are provided merely to serve as examples. As shown in FIG. 7, when the object detection device 1 is positioned and located such that its audio sound beam strikes the object 125 (and not objects in front of the exemplary beams 130, 140), an echo wave 145 substantially similar to the echo wave 120 is reflected towards the user 90 and his or her ears 115. As such, the user 90, with sufficient human echolocation training is preferably able to understand where, in a lateral position, an object such as the object 125 is in front of him or her.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required".

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An object detection device for detecting objects in front of a user of the object detection device, the object detection device comprising:
   a parametric array including a transducer array coupled to the object detection device such that when the object detection device is used, the transducer array is located in front of the user;
   an activation member in communication with the parametric array for initiating the selection by the user of generation of an audible sound to be modulated with an inaudible, ultrasonic signal and amplified to create a higher signal in front of the user; and
   wherein air in front of the transducer array demodulates the two signals, and the audible audio signal but not the inaudible audio signal is reflected from an object and received by both ears of the user.

2. The object detection device of claim 1, wherein the object detection device includes a handle member for a user to use for holding the object detection device.

3. The object detection device of claim 1, wherein the transducer array comprises at least one of a plurality of ultrasonic transducers and a plurality of thin film transducers.

4. The object detection device of claim 1, wherein the object detection device is coupled to a walking aid.

5. The object detection device of claim 4, wherein the walking aid comprises a proximal end, and wherein the transducer array is disposed on the proximal end of the walking aid such that when the object detection device is used, the transducer array is located in front of the user and oriented so as to radiate a sound beam towards an object in front of the user.

6. The object detection device of claim 1, wherein the parametric array includes a transducer array to radiate a sound beam produced by the demodulation of an amplified ultrasonic carrier signal and an audio signal.

7. The object detection device of claim 1, wherein the object detection device includes a sound card with memory for storing a plurality of audio signals therein to produce a broad frequency spectrum.

8. The object detection device of claim 1, wherein the object detection device is incorporated into a wearable device.

9. A method comprising:
   selecting an audible audio signal;
   modulating via a parametric array an ultrasonic inaudible carrier signal and the audible audio signal;
   producing via a transducer array the ultrasonic carrier signal and the audible audio signal;
   demodulating the ultrasonic carrier signal and the audible audio signal to generate a beam of audible sound in a direction away from a user; and
   a user receiving the audio signal but not the inaudible audio signal from a reflection from an object.

10. The method of claim 9, wherein the ultrasonic carrier signal and the audio signal originate in front of the user.

11. An apparatus comprising;
    an object detection device;
    a walking aid coupled to the object detection device;
    a sound card to provide user selectable audio signals;
    a parametric array associated with the object detection device, the parametric array including a transducer array located in front of a user when the object detection device is used; and
    an activation member in communication with the parametric array for initiating the selection by the user of generation of an audible sound to be modulated with an inaudible, ultrasonic signal and amplified to create a higher signal in front of the user; and
    wherein the parametric array uses the transducer array to transmit an amplified inaudible ultrasonic carrier signal modulated by an audio signal that is demodulated to create an audio signal beam, wherein the audible sound beam and not the ultrasonic signal is reflected off of an object and received by both ears of a user.

12. The apparatus of claim 11, wherein the walking aid is a cane member.

13. The apparatus of claim 11, wherein the walking aid is a walker.

14. The apparatus of claim 11, wherein the transducer array comprises a plurality of ultrasonic transducers.

15. The apparatus of claim 11, wherein the walking aid comprises a proximal end, and wherein the transducer array is disposed on the proximal end of the walking aid such that when the object detection device is used, the transducer array is located in front of the user and oriented so as to radiate a sound beam towards an object in front of the user.

16. The apparatus of claim 11, wherein the parametric array includes a memory for storing a plurality of audio signals therein.

* * * * *

UNITED STATES PATENT AND TRADEMARK OFFICE
CERTIFICATE OF CORRECTION

| | |
|---|---|
| PATENT NO. | : 10,690,771 B2 |
| APPLICATION NO. | : 15/789072 |
| DATED | : June 23, 2020 |
| INVENTOR(S) | : Michael J. Biffignani et al. |

It is certified that error appears in the above-identified patent and that said Letters Patent is hereby corrected as shown below:

In the Specification

In Column 5, Line 10, delete "thereto" and replace with -- thermo --

Signed and Sealed this
Second Day of February, 2021

Drew Hirshfeld
*Performing the Functions and Duties of the
Under Secretary of Commerce for Intellectual Property and
Director of the United States Patent and Trademark Office*